(12) United States Patent
Tamura et al.

(10) Patent No.: US 10,647,401 B2
(45) Date of Patent: May 12, 2020

(54) BOAT

(71) Applicant: YANMAR CO., LTD., Osaka-shi, Osaka (JP)

(72) Inventors: Gakuji Tamura, Osaka (JP); Jun Watanabe, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/466,208

(22) Filed: Mar. 22, 2017

(65) Prior Publication Data
US 2017/0274973 A1 Sep. 28, 2017

(30) Foreign Application Priority Data

Mar. 25, 2016 (JP) ................................ 2016-062861

(51) Int. Cl.
*B63H 25/42* (2006.01)
*B63H 25/02* (2006.01)
(Continued)

(52) U.S. Cl.
CPC ............ *B63H 25/42* (2013.01); *B63H 21/14* (2013.01); *B63H 21/21* (2013.01); *B63H 25/02* (2013.01);
(Continued)

(58) Field of Classification Search
None
See application file for complete search history.

(56) References Cited

U.S. PATENT DOCUMENTS 6,273,771 B1    8/2001  Buckley et al.
9,555,869 B1 *  1/2017  Arbuckle ............. B63H 21/213
                        (Continued)

FOREIGN PATENT DOCUMENTS

JP    H01314694 A    12/1989
JP    H02227395 A     9/1990
                    (Continued)

OTHER PUBLICATIONS

Extended European Search Report for corresponding Application No. 17161774.9-1751; dated Aug. 11, 2017.
(Continued)

*Primary Examiner* — Nicholas K Wiltey
(74) *Attorney, Agent, or Firm* — Norton Rose Fulbright US LLP

(57) ABSTRACT

A boat includes: a propulsion device configured to generate propulsion force for a vessel body from driving force from an engine; a detection unit configured to detect a current position, a bow direction, and a movement speed of the vessel body; a steering device configured to change a cruising direction of the vessel body; a steering sensor configured to detect an operation amount of the steering device; and a control device that is connected to the propulsion device, the detection unit, and the steering sensor, and is configured to acquire an operating status of the propulsion device and a detection result obtained by the detection unit and the steering sensor, and to control the propulsion device based on the detection result. The control device executes a turning operation with the propulsion device, when the operation amount of the steering device detected by the steering sensor exceeds a threshold.

19 Claims, 7 Drawing Sheets

(51) Int. Cl.
   *B63H 21/14* (2006.01)
   *B63H 21/21* (2006.01)
   *G05D 1/02* (2006.01)
(52) U.S. Cl.
   CPC ........ *G05D 1/0206* (2013.01); *B63B 2201/00* (2013.01); *B63B 2758/00* (2013.01); *B63H 2025/022* (2013.01)

(56) References Cited

U.S. PATENT DOCUMENTS

| | | | | |
|---|---|---|---|---|
| 9,764,812 | B1* | 9/2017 | Arbuckle | B63H 21/21 |
| 2007/0245944 | A1* | 10/2007 | Scism | B63B 1/042 |
| | | | | 114/288 |
| 2008/0269968 | A1* | 10/2008 | Stewart | B63H 20/12 |
| | | | | 701/21 |
| 2009/0197486 | A1* | 8/2009 | Szilagyi | B63H 25/02 |
| | | | | 440/53 |
| 2010/0030411 | A1* | 2/2010 | Wilson | G05D 1/0875 |
| | | | | 701/21 |
| 2010/0145558 | A1 | 6/2010 | Kaji | |
| 2010/0256845 | A1* | 10/2010 | Mizutani | B63H 20/12 |
| | | | | 701/21 |
| 2010/0292876 | A1* | 11/2010 | Mizutani | B63H 21/22 |
| | | | | 701/21 |
| 2011/0010028 | A1* | 1/2011 | Mizutani | B63H 25/00 |
| | | | | 701/21 |
| 2013/0110329 | A1 | 5/2013 | Kinoshita et al. | |
| 2015/0191230 | A1* | 7/2015 | Toce | B63C 3/06 |
| | | | | 405/3 |
| 2015/0251732 | A1* | 9/2015 | Kooren | B63B 35/68 |
| | | | | 114/254 |
| 2016/0264227 | A1 | 9/2016 | Kinoshita et al. | |
| 2017/0029086 | A1* | 2/2017 | Watkins | B63H 11/117 |
| 2017/0274973 | A1* | 9/2017 | Tamura | B63H 25/42 |

FOREIGN PATENT DOCUMENTS

| | | |
|---|---|---|
| JP | H08-192794 A | 7/1996 |
| JP | 2622270 B2 | 6/1997 |
| JP | 2810087 B2 | 10/1998 |
| JP | 2006-264581 A | 10/2006 |
| JP | 2007-083910 A | 4/2007 |
| JP | 2010-126085 A | 6/2010 |
| JP | 2011-016502 A | 1/2011 |
| JP | 2013106082 A | 5/2013 |
| JP | 2014046847 A | 3/2014 |
| WO | 2006062416 A1 | 6/2006 |
| WO | 2010039952 A1 | 4/2010 |

OTHER PUBLICATIONS

Japanese Office Action dated Dec. 4, 2018 issued in corresponding Japanese Appiication No. 2616-5362861 cites the patent documents iisted in the information Disctosure Statement submitted on Aug. 19, 2019.

Japanese Office Action dated Dec. 4, 2018 issued in corresponding Japanese Application No. 2016-062861 cites the patent documents above.

* cited by examiner

BOAT

CROSS REFERENCE TO RELATED APPLICATIONS

The present invention claims priority under 35 U.S.C. § 119 to Japanese Application No. 2016-062861, filed Mar. 25, 2016, the entire content of which is incorporated herein by reference.

BACKGROUND OF THE INVENTION

Field of the Invention

The present invention relates to a vessel and particularly relates to a technique of enabling the vessel to be operable with a vehicle-like sense.

Description of the Related Art

Japanese Unexamined Patent Application Publication No. 2013-106082 A discloses a configuration in which pivot turn is implemented with a software key displayed on a display provided to a vessel.

Japanese Unexamined Patent Application Publication No. 2014-46847 A discloses a configuration in which the pivot turn is implemented with a joystick provided to a vessel.

SUMMARY OF THE INVENTION

Problems to be Solved by the Invention

An operation of vessels is largely different from that of vehicles in many aspects, and takes beginners a lot of time to become proficient. In view of this, an object of the present invention is to provide a technique with which a vessel can be operated with a vehicle-like sense.

Means of Solving the Problems

A boat includes: a propulsion device configured to generate propulsion force for a vessel body from driving force from an engine; a detection unit configured to detect a current position, a bow direction, and a movement speed of the vessel body; a steering device configured to change a cruising direction of the vessel body; a steering sensor configured to detect an operation amount of the steering device; and a control device that is connected to the propulsion device, the detection unit, and the steering sensor, and is configured to acquire an operating status of the propulsion device and a detection result obtained by the detection unit and the steering sensor, and to control the propulsion device based on the detection result. The control device is configured to execute a turning operation with the propulsion device, when the operation amount of the steering device detected by the steering sensor exceeds a threshold.

The control device may be configured to execute the turning operation with the propulsion device, when the movement speed of the vessel body detected by the detection unit is not higher than a predetermined value.

A notification unit configured to issue a notification to an operator when the turning is executed with the steering device may be further provided.

Advantageous Effects of the Invention

With the present invention, a turning operation is achieved with a steering device so that a vessel can be operated with a vehicle-like sense, and an operator can enjoy a higher usability.

DETAILED DESCRIPTION OF THE PREFERRED EMBODIMENTS

Figure 1:
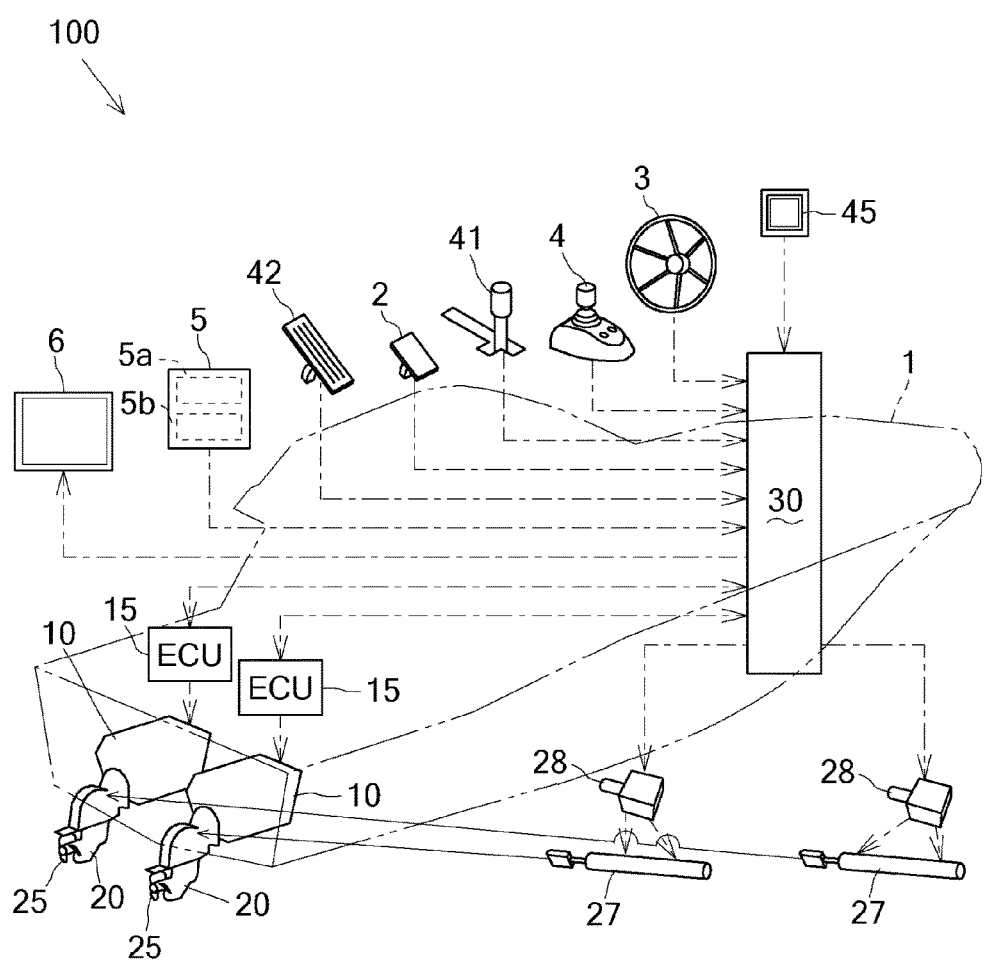
FIG. 1 is a diagram illustrating a basic configuration of a vessel.
Figure 2:
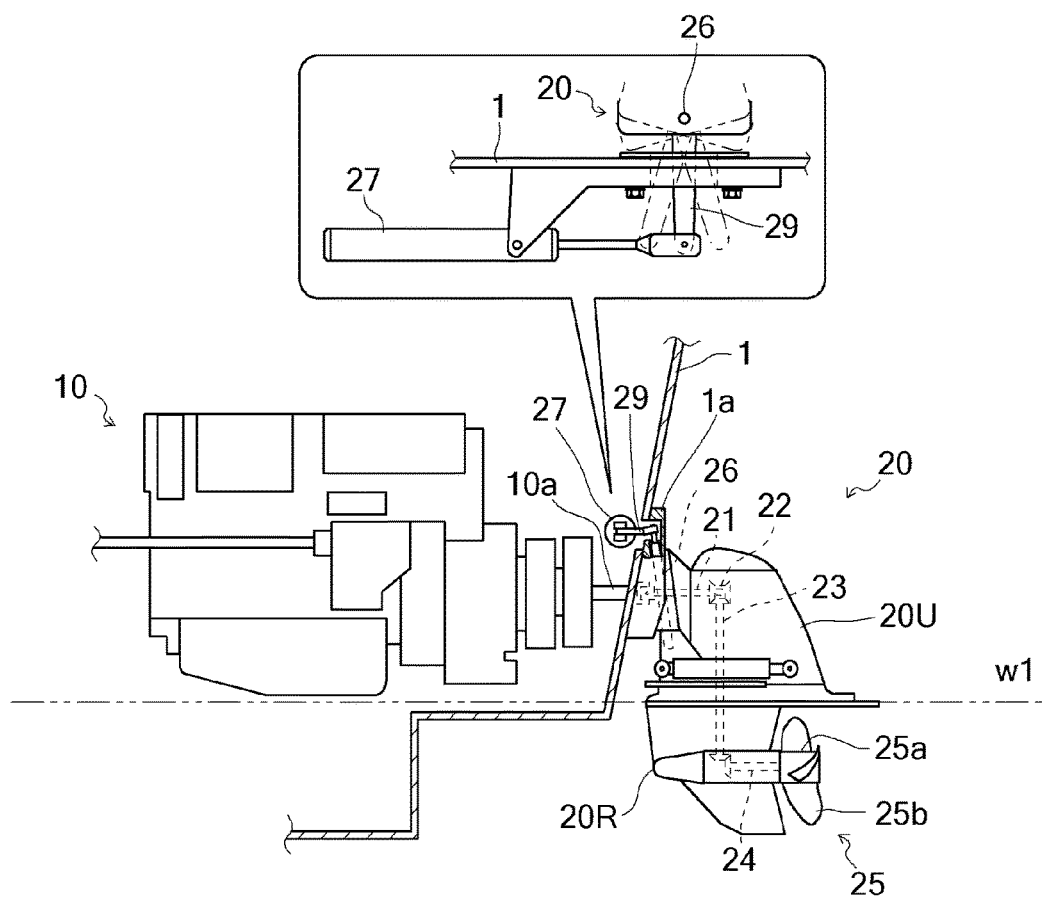
FIG. 2 is a diagram illustrating an engine and an outdrive device.

A vessel 100 is described with reference to FIG. 1 and FIG. 2. The vessel 100 described in the present embodiment is what is known as a twin-screw vessel. However, the number of propeller shafts is not limited to that in this configuration, and may be any number more than one.

The vessel 100 has a vessel body 1 including two engines 10 and two outdrive devices 20. The outdrive devices 20, as propulsion devices, are each driven by a corresponding one of the engines 10, so that a propulsion propeller 25 rotates to generate propulsion force for the vessel body 1. The vessel body 1 includes operation tools for operating the vessel 100, such as an accelerator pedal 2, a steering wheel 3, a joystick lever 4, a shift lever 41, and a brake pedal 42. An operating status of the engine 10, propulsion force output by the outdrive devices 20, and the applied direction of the force are controlled in accordance with an operation on these operation tools.

The vessel 100 according to the present embodiment is a sterndrive vessel including the two engines 10 and the two outdrive devices 20. However, the vessel 100 is not limited to this, and may be shaft vessel including a plurality of propeller shafts, or may be a vessel with a pod propulsion device for example.

The cruising direction of the vessel 100 can be changed by changing the output direction of the outdrive device 20 by operating the steering wheel 3 or the joystick lever 4 on the vessel body 1.

The vessel body 1 includes a vessel operation control device 30 for controlling the vessel 100.

The vessel body 1 includes an operation unit, for controlling the outdrive device 20 for operating the vessel, such as the steering wheel 3, the joystick lever 4, the shift lever 41, and the brake pedal 42 and further includes a detection unit 5 for detecting a current position, a bow direction, and a movement speed of the vessel body 1. The detection unit 5 includes: a global navigation satellite system (GNSS) device 5a that detects the current position and the movement speed of the vessel body 1; and a heading sensor 5b that detects the bow direction. The GNSS device 5a uses the GNSS to acquire the current position of the vessel body 1 once in every predetermined period of time, and thus not only detects the current position of the vessel body 1 but also detects the movement speed and the movement direction based on a position movement. A turning speed is detected based on a changed amount of the bow direction, detected by the heading sensor 5b, per unit time. The vessel body 1 is provided with a monitor 6 that is disposed close to the steering wheel 3 or the like, and displays an operation state of the operation tools, a detection result obtained by the detection unit 5, and the like.

In the present embodiment, the detection unit 5 including the GNSS device 5a and the heading sensor 5b detects the current position, the bow direction, the movement speed, and the like of the vessel body 1. However, this should not be construed in a limiting sense. For example, a configuration may be employed in which the parameters are separately detected with the current position of the vessel body detected by the GNSS device, the bow direction of the vessel body detected by a gyro sensor, and a speed of the vessel body through the water detected by an electromagnetic log. Furthermore, a configuration may be employed in which all of the current position, the bow direction, and the movement speed are detected by the GNSS device only.

An electronic control unit (ECU) 15 controls the engine 10, and is provided to each of the engines 10. The ECU 15 stores various programs and data for controlling the engine 10. The ECU 15 have a configuration of being connected with a central processing unit (CPU), a read only memory (ROM), a random access memory (RAM), a hard disk drive (HDD), and the like through a bus, or a configuration including a one-chip large scale integration (LSI) or the like.

The ECU 15 is electrically connected to a fuel adjustment valve and a fuel injection valve for an unillustrated fuel supply pump of the engine 10, and to various sensors that detect an operating state of various devices. The ECU 15 controls a supply amount of the fuel adjustment valve and opening/closing of the fuel injection valve, and acquires information detected by the various sensors.

The outdrive device 20 rotates the propulsion propeller 25 to generate propulsion force for the vessel body 1. The outdrive device 20 includes an input shaft 21, a switching clutch 22, a driving shaft 23, an output shaft 24, and the propulsion propeller 25. In the present embodiment, one outdrive device 20 is coupled to one engine 10 in an interlocking manner. The number of outdrive devices 20 coupled to one engine 10 is not limited to that in the present embodiment. A drive device is not limited to the outdrive device 20 in the present embodiment. A device with which the propeller is directly or indirectly driven by the engine or a pod based device may be employed.

The input shaft 21 transmits rotary driving force from the engine 10 to the switching clutch 22. The input shaft 21 has one end coupled to a universal joint attached to an output shaft 10a of the engine 10, and has the other end coupled to the switching clutch 22 disposed in an upper housing 20U.

The switching clutch 22 can switch the rotary driving force transmitted via the input shaft 21 or the like from the engine 10 between a normal rotation direction and a reverse rotation direction. The switching clutch 22 includes a normal rotation bevel gear and a reverse rotation bevel gear coupled to an inner drum including disk plates. With the switching clutch 22, the driving force is transmitted with a pressure plate of an outer drum, coupled to the input shaft 21, pressed against any one of the disk plates. Furthermore, with the switching clutch 22, the pressure plate is incompletely pressed against any one of the disk plates to achieve a half-clutch state, so that the rotary driving force from the engine 10 can be partially transmitted to the propulsion propeller 25, or is positioned at a neutral position with the pressure plate pressed against none of the disk plates so that the rotary driving force from the engine 10 cannot be transmitted to the propulsion propeller 25.

The driving shaft 23 transmits the rotary driving force, transmitted from the engine 10, via the switching clutch 22 or the like, to the output shaft 24. The driving shaft 23 has one end provided with a bevel gear meshing with the normal rotation bevel gear and the reverse rotation bevel gear of the switching clutch 22, and has the other end provided with a bevel gear meshing with a bevel gear of the output shaft 24 disposed in a lower housing 20R.

The output shaft 24 transmits the rotary driving force, transmitted from the engine 10 via the driving shaft 23 or the like, to the propulsion propeller 25. The output shaft 24 has one end provided with the bevel gear meshing with the bevel gear of the driving shaft 23 as described above, and has the other end attached to the propulsion propeller 25.

The propulsion propeller 25 rotates to generate the propulsion force. The propulsion propeller 25 is driven by the rotary driving force transmitted from the engine 10 via the output shaft 24 or the like, in such a manner that a plurality of blades 25b, arranged around a rotation shaft 25a, rotate in the water in their periphery to generate the propulsion force.

The outdrive devices 20 are supported by a gimbal housing 1a attached to a transom board of the vessel body 1. More specifically, the outdrive device 20 is supported by the gimbal housing 1a in such a manner that a gimbal ring 26 as a rotation shaft of the device is arranged substantially orthogonal to a waterline wl.

The gimbal ring 26 has an upper portion extending in the gimbal housing 1a (vessel body 1) and having an upper end attached to a steering arm 29. When the steering arm 29 is pivoted, the gimbal ring 26 rotates, whereby the outdrive device 20 rotates about the gimbal ring 26. The steering arm 29 is driven by a hydraulic actuator 27 that operates in accordance with an operation on the steering wheel 3 or the joystick lever 4. The hydraulic actuator 27 is controlled with an electromagnetic proportional control valve 28 that switches a flowing direction of hydraulic oil in accordance with an operation on the steering wheel 3 or the joystick lever 4.

Figure 3:
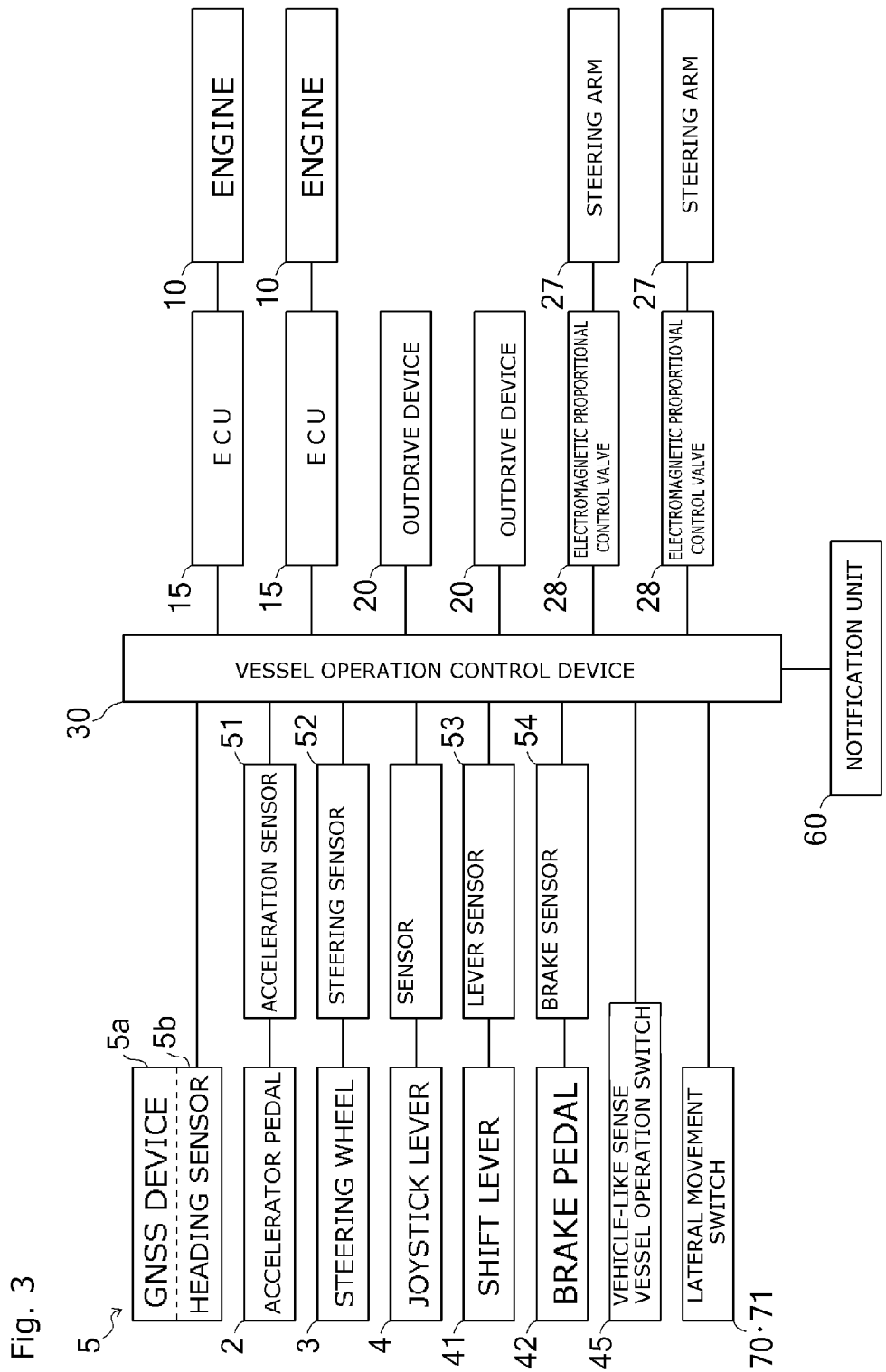
FIG. 3 is a block diagram corresponding to steering control.

A vessel steering control configuration of the vessel operation control device is described below with reference to FIG. 3 to FIG. 7. As illustrated in FIG. 3, the vessel operation control device 30 controls the engine 10 and the outdrive device 20 based on a detection signal from the operation tools such as the accelerator pedal 2, the steering wheel 3, the joystick lever 4, the shift lever 41, and the brake pedal 42. The vessel operation control device 30 acquires information on the current position, the movement speed, the movement direction, the bow direction, and a turning amount of the vessel body 1, from the detection unit 5 (the GNSS device 5a and the heading sensor 5b). The vessel operation control device 30 performs operation control for the vessel 100 based on the detection result from the detection unit 5 and an operation on each operation tool.

The vessel operation control device 30 stores various programs and data for controlling the engine 10 and the outdrive devices 20. The vessel operation control device 30 may have a configuration of being connected with a CPU, a ROM, a RAM, an HDD, and the like through a bus, or a configuration including a one-chip LSI or the like.

The vessel operation control device 30 is connected to the accelerator pedal 2, the steering wheel 3, the joystick lever 4, the shift lever 41, the brake pedal 42, and the like, and acquires a detection signal generated by various sensors when these operation tools are operated.

Specifically, as illustrated in FIG. 3, the vessel operation control device 30 is electrically connected to: an acceleration sensor 51 that detects a depression amount as an operation amount of the accelerator pedal 2; a steering sensor 52 that detects a rotation angle as an operation amount of the steering wheel 3; a sensor that detects an operation angle, an operation amount, and the like of the joystick lever 4; a lever sensor 53 that detects an operation position of the shift lever 41; and a brake sensor 54 that detects a depression amount as an operation amount of the brake pedal 42. The vessel operation control device 30 acquires a detection value based on a detection signal transmitted from each of these sensors as the operation amount of the corresponding operation tool.

The vessel operation control device 30 is electrically connected to the ECU 15 of each engine 10, and acquires various detection signals related to the operating state of the engine 10 acquired by the ECU 15. The vessel operation control device 30 transmits to the ECU 15: a signal for turning ON and OFF a power supply to each engine 10 (ECU 15); and a control signal for controlling the fuel adjustment valve for the fuel supply pump and various other devices of the engine 10. The vessel operation control device 30 is electrically connected to the electromagnetic proportional control valve 28 of each outdrive device 20, and controls the electromagnetic proportional control valve 28 for steering based on a control signal from each operation tool.

Figure 4:
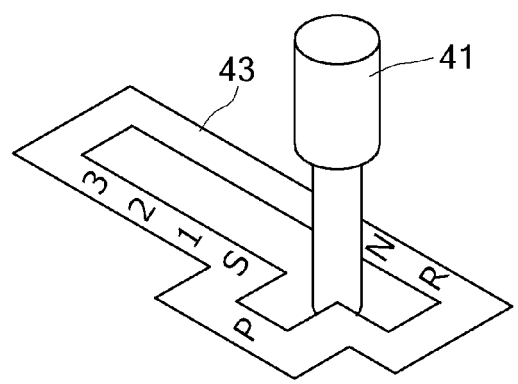
FIG. 4 is a diagram illustrating a configuration of a shift lever.
Figure 4:
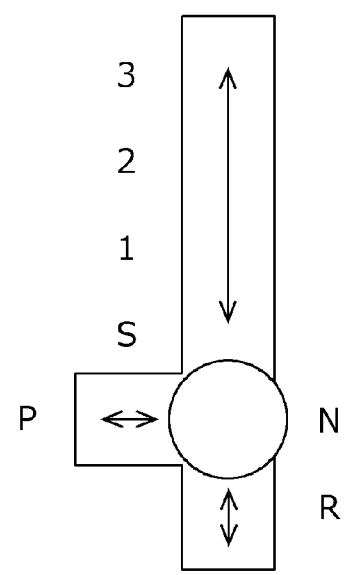

Next, a configuration of the shift lever 41 is described with reference to FIG. 4. As illustrated in FIG. 4, a lever guide 43 for guiding the operation of the shift lever 41 is disposed around the shift lever 41. The lever guide 43 includes forward (S, 1, 2, and 3) positions, a neutral (N) position, and a reverse (R) position linearly arranged and further includes a positioning (P) position arranged on one side of the neutral (N) position. The shift lever 41 can be held at each of these positions. The lever sensor 53 detects a shift position at which the shift lever 41 is held. The shift lever 41 is linearly operated among the neutral (N) position, the forward (S, 1, 2, and 3) positions along the lever guide 43, and the reverse (R) position, and is operated in a direction orthogonal to the linear direction to be moved from the neutral (N) position to the positioning (P) position.

As described above, the operation position of the shift lever 41 according to the present embodiment includes a total of seven positions including the forward, neutral, reverse, and positioning positions. The forward positions include a plurality of speed position stages each being set to an individual speed range. Specifically, the forward (S) position corresponds to trolling (ultralow speed), the forward (1) position corresponds to low speed, the forward (2) position corresponds to mid speed, and the forward (3) position corresponds to high speed. The positions of the shift lever 41 are not limited to those in the present embodiment, and may include any number of positions, as long as the four positions of forward, neutral, reverse, and positioning are at least included. The shape of the lever guide 43 is not limited to that in the present embodiment. Still, the operation direction for the movement to the positioning position is preferably different from the operation direction between the neutral position and the forward position or the reverse position.

When the shift lever 41 is operated to be at the positioning (P) position, dynamic positioning control is performed. The dynamic positioning control is control for maintaining the position of the vessel 100 and an azimuth of the bow of the vessel body 1. In the dynamic positioning control, the ECU 15 of each engine 10 and each outdrive device 20 are controlled in such a manner that external force such as wind power and tidal power and the propulsion force output by the two outdrive devices 20 are balanced.

Specifically, when the lever sensor 53 detects that the operation position of the shift lever 41 is the positioning position and the vessel operation control device 30 acquires this detection result, the vessel operation control device 30 calculates a target movement amount, a target movement direction, and a target turning amount based on the information on the current position, the movement speed, the movement direction, the bow direction, and the turning amount of the vessel body 1 acquired from the detection unit 5. Then, the vessel operation control device 30 controls the operating state of each engine 10 and a magnitude and a direction of the propulsion force of each outdrive device 20, in accordance with the result of the calculation. With the vessel operation control device 30 thus performing the dynamic positioning control, the vessel 100 can be automatically maintained at a set position and a set azimuth on the water.

The maximum rotation speed of the engine 10 is set in accordance with the operation position of the shift lever 41. As a result, association between the output and the depression amount of the accelerator pedal 2 up to the maximum output is controlled in such a manner that the maximum output from the outdrive device 20 (the maximum movement speed of the vessel body 1) is achieved when the accelerator pedal 2 is depressed by the maximum amount. Thus, an operation on the shift lever 41 leads to pseudo-gear change, with the speed range achievable based on the output from the outdrive device 20 set for each of the operation positions. The actual output (the cruising speed of the vessel 100) from the outdrive device 20 within the speed range set with the shift lever 41 is controlled with the accelerator pedal 2 as described below.

The vessel body 1 has a single accelerator pedal 2 for controlling the rotation speed of two engines 10. The acceleration sensor 51 detects a depression amount of the accelerator pedal 2, and the vessel operation control device 30 transmits the control signal to the ECU 15 in accordance with the depression amount of the accelerator pedal 2 thus detected, whereby the rotation speed of the engine 10 is changed.

Thus, the output of the outdrive device 20 is controlled in accordance with the operation position of the shift lever 41 and the depression amount (depression strength) of the accelerator pedal 2, whereby the cruising speed of the vessel 100 is determined.

A detail operation can be performed within the low speed range, with the depressed amount of the accelerator pedal 2 associated with a slip rate (trolling rate) in the half-clutch state of the switching clutch 22 in a state where the shift lever 41 is operated to be at the low speed forward (S) position to set the forward low speed range.

As described above, in the present embodiment, the shift lever 41 is movable among operation positions, at least including the four operation positions corresponding to forward, neutral, reverse, and positioning. The cruising speed of the vessel 100 is regulated with the maximum output of the outdrive device 20 controlled in accordance with the operation position. Thus, the pseudo-gear shift similar to that in the vehicle can be performed in the vessel 100, with the operation position of the shift lever 41 changed to achieve the desired cruising speed of the vessel 100. All things considered, the vessel can be operated with a vehicle-like sense. The dynamic positioning control is performed for the vessel 100 when the shift lever 41 is operated to be at the positioning position. Thus, a pseudo-parking control similar to that in the vehicle is performed, so that the vessel can be operated (vessel stop operation) with a vehicle-like sense.

The output of the outdrive device 20 is controlled with the accelerator pedal 2 within the speed range set with the shift lever 41. This is equivalent to a traveling control operation in a vehicle, whereby the vessel can be operated with a vehicle-like sense.

The cruising speed may be limited so as not to exceed a speed limit within a restricted area, with the GNSS device 5a detecting the cruising speed and the current position of the vessel 100 and determining whether the vessel 100 is within the restricted area, where the cruising speed is limited, based on the current position, so that the speed needs not to be constantly checked inside the bay. Thus, the speed can be automatically prevented from exceeding the set speed even when the shift lever 41 is operated to achieve the speed range overwhelming the speed limit. The torque may be set to be large on a low speed side by adjusting the association between the depression amount of the accelerator pedal 2 and the resultant output of the outdrive device 20, or changing a value applied for the fuel injection amount control determined based on the output of the outdrive device 20 itself, such as an engine load or an engine rotation speed for example.

The brake pedal 42 is used for controlling the magnitude and the direction of the two outdrive device 20 so that the movement speed of the vessel body 1 can be reduced. The vessel body 1 includes a single brake pedal 42. The brake sensor 54 detects the depression amount of the brake pedal 42, and the vessel operation control device 30 changes the rotation speed of the engine 10 and the magnitude and the direction of the propulsion force output from the outdrive device 20, in accordance with the depression amount of the brake pedal 42 detected. Thus, the cruising speed of the vessel 100 is limited with the magnitude and the direction of the propulsion force of the outdrive device 20 controlled in accordance with the depression amount (depression strength) of the brake pedal 42.

Specifically, the brake sensor 53 detects the operation amount of the brake pedal 42, and the vessel operation control device 30 determines the magnitude and the applied direction of the propulsion force of the outdrive device 20 based on the detected value, whereby a deceleration amount of the vessel body 1 is determined.

For example, when the brake pedal 42 is continuously lightly depressed, the vessel 100 is gradually decelerated to eventually stop, with the magnitude of the propulsion force of the outdrive device 20 reduced with no change in the direction of the output, or with the direction reversed after the output is reduced. When the brake pedal 42 is heavily depressed, the direction of the output of the outdrive device 20 is reversed so that the vessel 100 quickly slows down to be stopped. Even heavier depression of the brake pedal 42 activates an astern operation of increasing the output of the outdrive device 20 with the output direction reversed, so that emergency stop of the vessel 100 is implemented. The emergency stop of the vessel can be achieved with delay processing, for reducing the shock involved in the astern operation, set to be short. When the brake pedal 42 continues to be depressed, the propulsion force of the outdrive device 20 is controlled until the movement speed of the vessel 100 eventually drops to zero. The depression amount of the brake pedal 42 is appropriately associated with the propulsion force of the outdrive device 20. The level as a result of an operation on the brake pedal 42 may be determined not only based on the depression amount of the brake pedal 42 but also based on the output of the engine 10 and the depression amount of the brake pedal 42.

When the movement speed of the vessel body 1 is reduced by operating the brake pedal 42, the current position and the movement speed of the vessel body 1 are detected by the GNSS device 5a. When the operation on the brake pedal 42 is detected in a state where the movement speed of the vessel body 1 is zero, the vessel operation control device 30 executes the dynamic positioning control. Thus, when the brake pedal 42 is operated in a state where the vessel body 1 is stopped, the magnitude and the direction of the propulsion force output by the outdrive device 20 are controlled in such a manner that the stopped position and the stopped azimuth of the vessel 100 are maintained.

Specifically, the brake pedal 42 is operated as follows. The cruising vessel 100 is decelerated with the brake pedal 42 depressed in accordance with a desired deceleration level. The vessel 100 being thus decelerated stops when the brake pedal 42 continues to be depressed until the movement speed drops to zero. The vessel 100 is stopped and maintained at a predetermined position as follows. First of all, the brake pedal 42 is depressed so that the vessel body 1 is decelerated, and continues to be depressed until the movement speed drops to zero. The brake pedal 42 is further pressed thereafter. This operation activates the dynamic positioning control so that the vessel 100 can be maintained at the predetermined stopped position.

When the brake pedal 2 of the vessel body 1 is operated as described above, the movement speed of the vessel body 1 can be reduced, and the vessel body 1 can be maintained at the stopped position by operating the brake pedal 42 while the vessel is stopped. These operations are equivalent to the deceleration/stopping operation for a vehicle. All things considered, the vessel can be operated with a vehicle-like sense.

The steering wheel 3 is used for changing the direction of the output of the outdrive device 20 for changing the cruising direction of the vessel body 1. The steering sensor 52 detects a rotation angle as the operation amount of the steering wheel 3. The vessel 100 has a unique operation which is unable to be performed with a vehicle. The operation is known as "pivot turn", which is turning involving no front or rear movement, achieved with the output directions of the outdrive device 20 set to be opposite to each other. In the present embodiment, the turning operation as known as the "pivot turn" is achieved by operating the steering wheel 3.

The vessel operation control device 30 enables or disables the operation, for achieving the turning with no front or rear movement, to be performed with the steering wheel 3, in accordance with the movement speed of the vessel body 1 detected by the detection unit 5 (cruising speed of the vessel 100).

The vessel operation control device 30 implements the turning in the steering direction of the steering wheel 3 with the output directions of the outdrive devices 20 and 20 set to be opposite to each other, when the cruising speed of the vessel 100 is not higher than a predetermined value and the rotation angle detected by the steering sensor 52 exceeds a predetermined threshold (for example, 360°).

As illustrated in FIG. 3, the vessel operation control device 30 is electrically connected to a notification unit 60.

The notification unit 60 is disposed close to the steering wheel 3. The notification unit 60 issues a notification sound, light, or the like so that an operator can recognize that the vessel turns without moving forward or backward, when the vessel operation control device 30 performs the turning operation.

As described above, the "pivot turn" of turning the vessel with no forward or backward movement can be implemented by only operating the steering wheel 3. Thus, the vessel can be operated with a vehicle-like sense, and the operator can enjoy higher usability. The cruising speed of the vessel 100 is limited as the condition for executing the "pivot turn", whereby sudden turning can be prevented from accidentally occurring. The notification unit 60 performs the notification when the "pivot turn" is performed, whereby the vessel operability is guaranteed for the operator.

The vessel can be operated with more vehicle-like sense with the following operation. Specifically, a cruising route of the vessel 100 may be estimated based on the operation amount of the steering wheel 3 and the cruising speed of the vessel 100. Then, when the current position of the vessel 100 is deviated from the estimated cruising route by a predetermined value or more, the output of the outdrive device 20 may be corrected in such a manner that the vessel 100 returns to the estimated cruising route.

With such a correction, the steering control less affected by tidal current or waves can be achieved. All things considered, the vessel can be operated with more vehicle-like sense.

The control for performing the "pivot turn" may be achieved by operating the joystick lever 4. When the vessel is operated with the joystick lever 4, the vessel operation with the steering wheel 3 is disabled.

As illustrated in FIG. 3, the vessel operation control device 30 is connected to a left switch 70 and a right switch 71 for moving the vessel body 1 in a lateral direction. An arrangement of the lateral movement switches 70 and 71 is not limited. For example, the switches are provided at a position, such as the center (hub portion) of the steering wheel 3 or on the monitor 6, convenient for performing the lateral movement operation. This lateral movement of the vessel body 1 is unique to the vessel 100 and thus cannot be performed with a vehicle. The operation is performed with the output directions of the outdrive device 20 set to be opposite to each other and with the output adjusted to achieve a synthetic vector of the propulsion force directed in a port direction or a starboard direction. In this embodiment, the lateral movement is executed by operating the switches 70 and 71.

The control for performing the "lateral movement" can be implemented with the operation on the joystick lever 4. When the vessel is operated with the joystick lever 4, the vessel operation with the lateral movement switches 70 and 71 is disabled.

As illustrated in FIG. 3, the vessel operation control device 30 is connected to a vehicle-like sense vessel operation switch 45 for starting/stopping the control for operating the vessel 100 with a vehicle-like sense. For example, the vehicle-like sense vessel operation switch 45 is disposed close to the steering wheel 3. When the vehicle-like sense vessel operation switch 45 is ON, the vehicle-like sense vessel operation control described above is performed with the vessel operation control device 30. When the vehicle-like sense vessel operation switch 45 is OFF, normal vessel operation control is performed with the vessel operation control device 30.

The normal vessel operation control corresponds to conventional vessel operation control with the "pivot turn" performed with the steering wheel 3 as well as a part of or all of the vessel operation control by the shift lever 41, the accelerator pedal 2, and the brake pedal 42 disabled.

Next, each vehicle-like sense vessel operation control flow, implemented with the vehicle-like sense vessel operation switch 45 being ON, is described with reference to FIG. 5 to FIG. 7.

Figure 5:
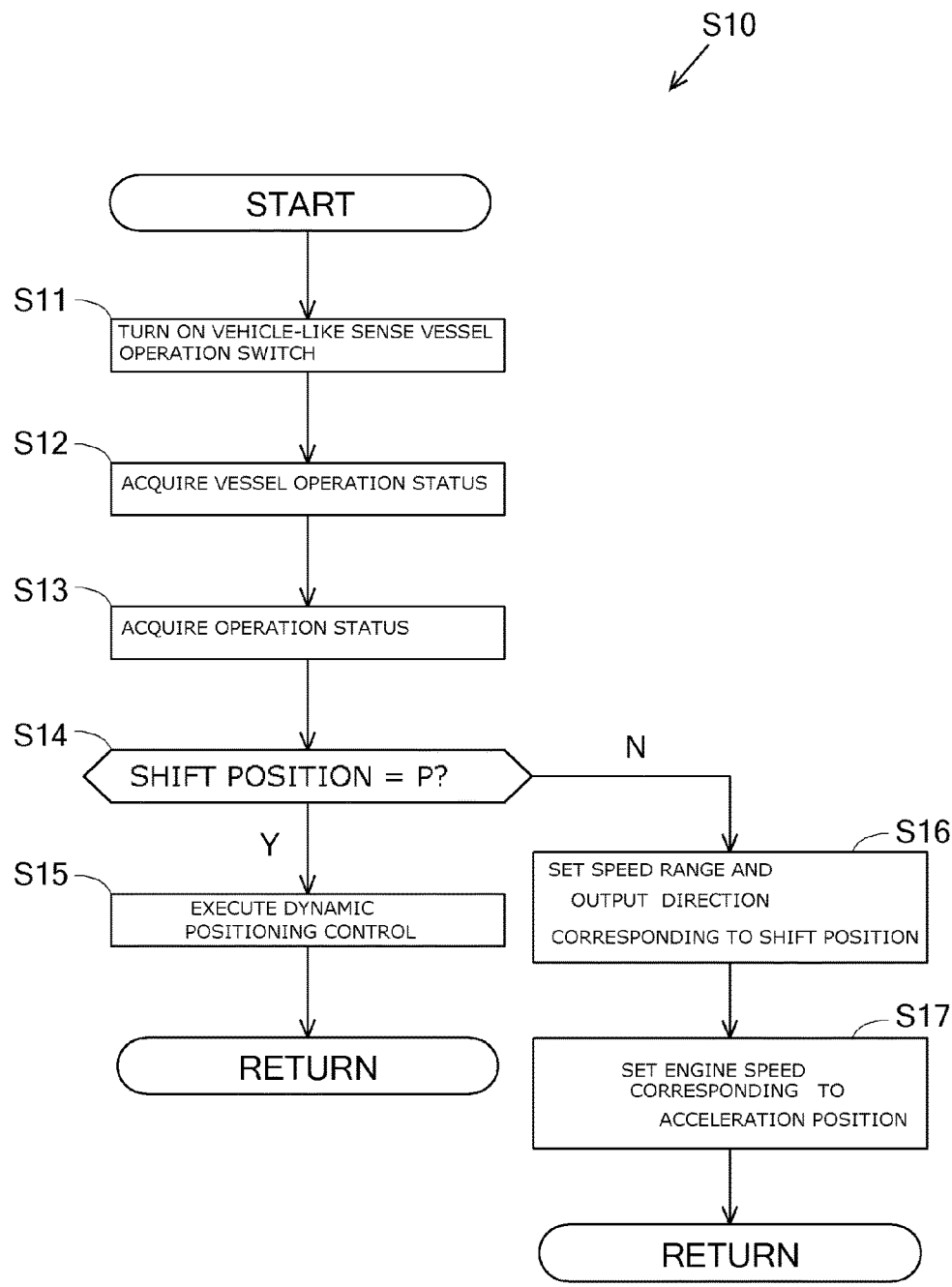
FIG. 5 is a diagram illustrating a flow of a vehicle-like sense vessel operation.

FIG. 5 illustrates a control step S10 related to an operation on the shift lever and the accelerator pedal. First of all, in step S11, information indicating that the vehicle-like sense vessel operation switch 45 is ON is acquired. In step S12, the vessel operation status (the information on the current position, the movement speed, the movement direction, the bow direction, and the turning amount detected by the detection unit 5) is acquired. In step S13, the operation status (information on the operation amount of the operation tool detected by various sensors) is acquired.

Next, in step S14, whether the shift lever 41 detected by the lever sensor 53 is at the positioning (P) position is determined. When the shift lever 41 is at the positioning (P) position (S14: Y), the dynamic positioning control is executed in step S15. When the shift lever 41 is at a position other than the positioning (P) position (S14: N), the speed range and the output direction corresponding to the shift position are set in step S16. Then, in step S17, the engine speed corresponding to the acceleration position of the accelerator pedal 2, detected by the acceleration sensor 51, is set.

Figure 6:
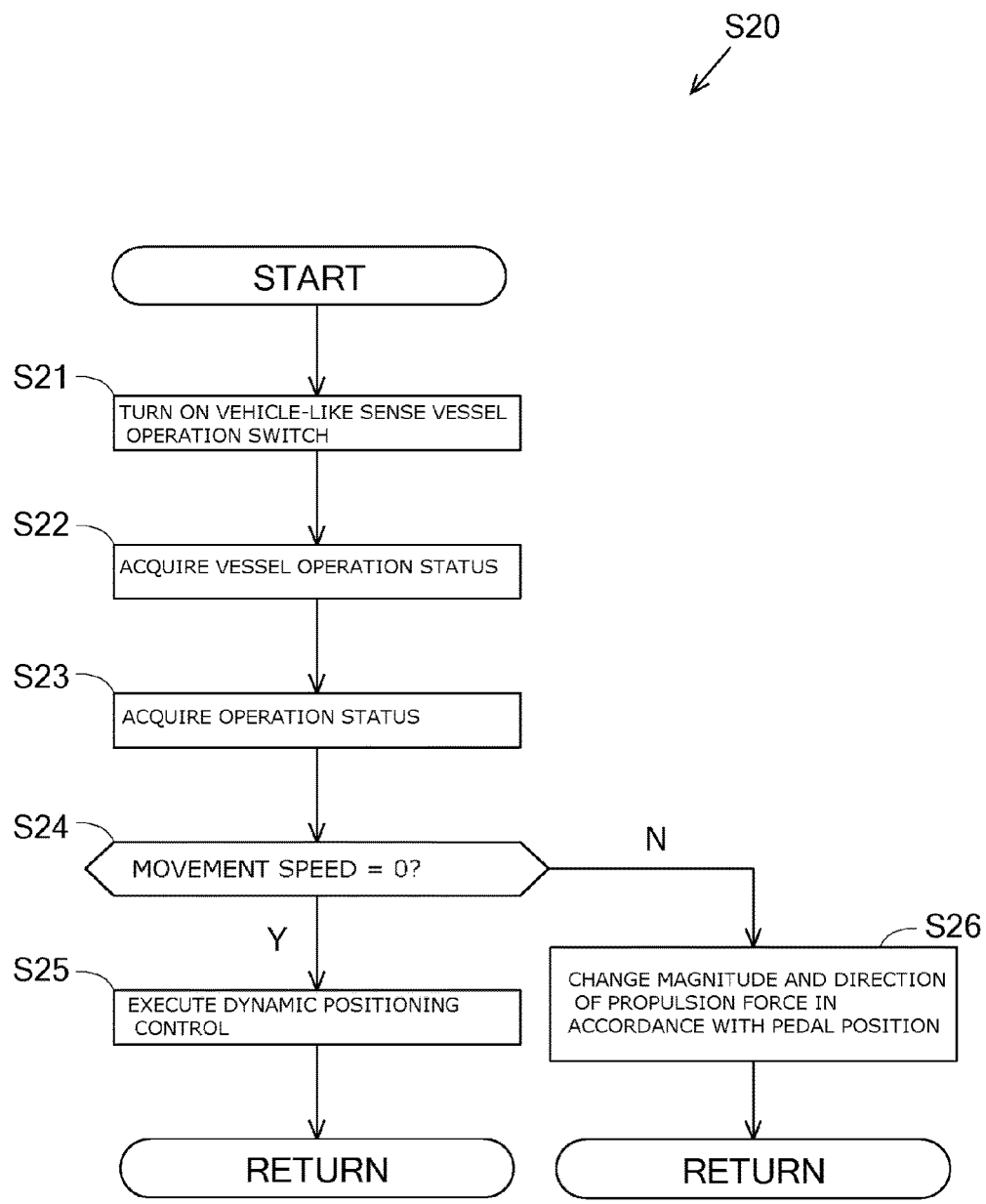
FIG. 6 is a diagram illustrating a flow of a vehicle-like sense vessel operation.

FIG. 6 illustrates a control step S20 related to an operation on the brake pedal. First of all, in step S21, the information indicating that the vehicle-like sense vessel operation switch 45 is ON is acquired. In step S22, the vessel operation status (the information on the current position, the movement speed, the movement direction, the bow direction, and the turning amount detected by the detection unit 5) is acquired. In step S23, the operation status (information on the operation amount of the operation tool detected by various sensors) is acquired.

Next, in step S24, whether the movement speed of the vessel body 1 detected by the detection unit 5 is zero is determined. When the movement speed is zero (S24: Y), the dynamic positioning control is executed in step S25. When the movement speed is not zero (S24: N), the magnitude and the direction of the propulsion force output by the outdrive device 20 are changed in accordance with the pedal position of the brake pedal 42 detected by the brake sensor 54, in step S26.

Figure 7:
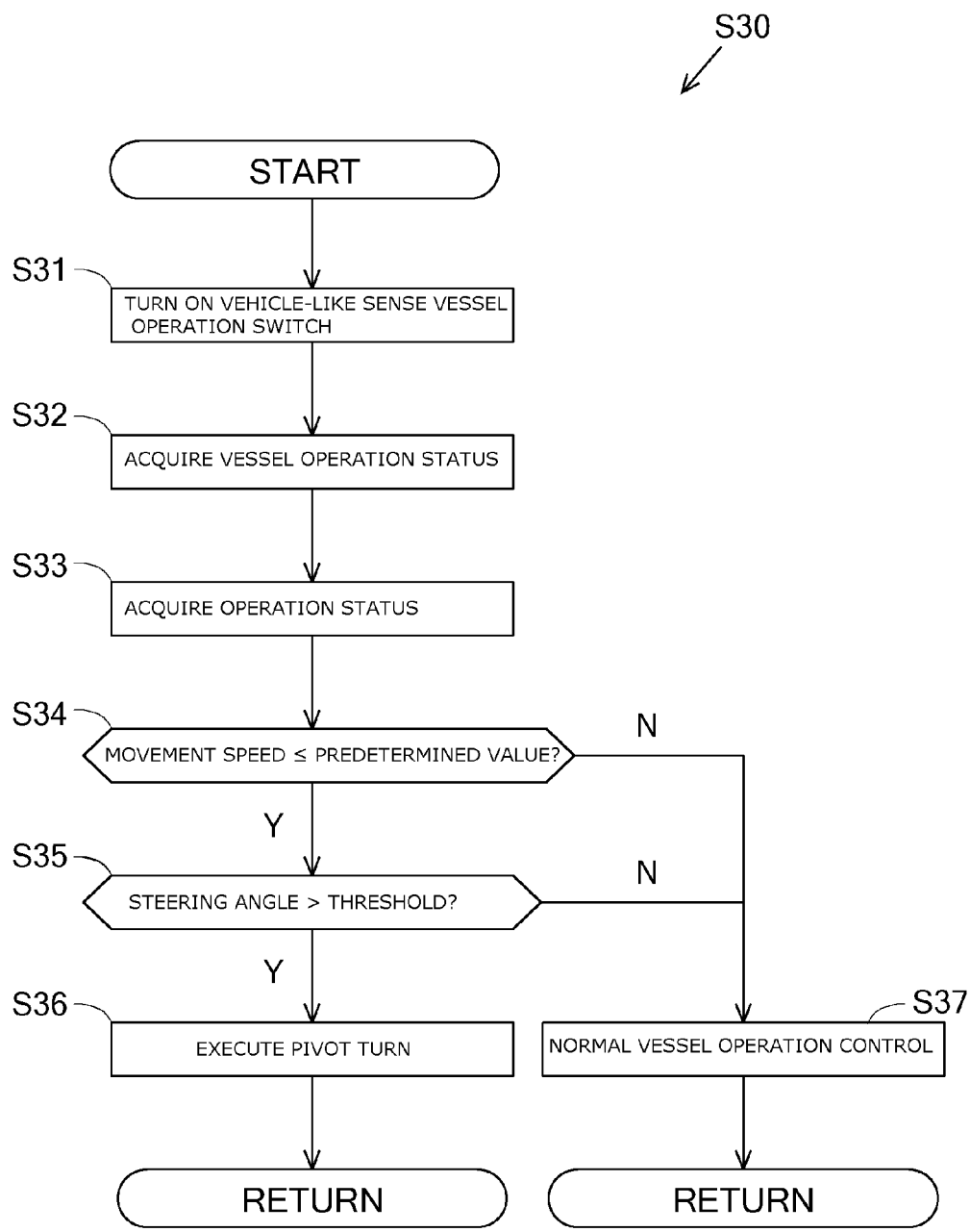
FIG. 7 is a diagram illustrating a flow of a vehicle-like sense vessel operation.

FIG. 7 illustrates a control step S30 related to an operation on the steering wheel. First of all, in step S31, the information indicating that the vehicle-like sense vessel operation switch 45 is ON is acquired. In step S32, the vessel operation status (the information on the current position, the movement speed, the movement direction, the bow direction, and the turning amount detected by the detection unit 5) is acquired. In step S33, the operation status (information on the operation amount of the operation tool detected by various sensors) is acquired.

Then, in step S34, whether the movement speed of the vessel body 1 detected by the detection unit 5 is not higher than the predetermined value is determined. When the movement speed is not higher than the predetermined value (S34: Y), whether the steering angle of the steering wheel 3 detected by the steering sensor 52 exceeds the threshold is determined in step S35. When the steering angle exceeds the threshold (S35: Y), the pivot turn is executed in step S36. When the movement speed is lower than the predetermined value (S34: N) or the steering angle does not exceed the threshold (S35: N), the processing proceeds to step S37 and the normal vessel operation control continues.

The invention claimed is:

1. A boat comprising:
a propulsion device configured to generate propulsion force for a vessel body from driving force from one or more engines, wherein the propulsion device comprises a first outdrive device and a second outdrive device;
a detection unit configured to detect a current position, a bow direction, and a movement speed of the vessel body;
a steering device configured to change a cruising direction of the vessel body;
a steering sensor configured to detect a first operation amount of the steering device at a first time and detect a second operation amount of the steering device at a second time; and
a control device that is connected to the propulsion device, the detection unit, and the steering sensor, the control device configured to:
acquire an operating status of the propulsion device and a detection result obtained by the detection unit and the steering sensor,
control the propulsion device based on the detection result,
control an output direction of the first outdrive device to be the same as an output direction of the second outdrive device to execute a non-pivot turn of the vessel body when the first operation amount of the steering device detected by the steering sensor is less than a first threshold, and
control the output direction of the first outdrive device to be opposite to the output direction of the second outdrive device to execute a pivot turn with no forward and backward movement with the propulsion device, when the second operation amount of the steering device detected by the steering sensor exceeds the first threshold.

2. The boat according to claim 1, further comprising a notification unit configured to issue a notification to an operator when the pivot turn is executed with the steering device.

3. The boat according to claim 1, wherein the one or more engines comprise:
a first engine coupled to the first outdrive device; and
a second engine coupled to the second outdrive device.

4. The boat according to claim 1, wherein the control device is further configured to execute the pivot turn with the propulsion device, when the movement speed of the vessel body detected by the detection unit is less than or equal to a second threshold.

5. The boat according to claim 4, further comprising a notification unit configured to issue a notification to an operator when the pivot turn is executed with the steering device.

6. The boat according to claim 1, wherein the second time is subsequent to the first time.

7. A boat comprising:
a vessel body;
a propulsion system coupled to the vessel body comprising:
one or more engines;
a first outdrive device coupled to the one or more engines;
a second outdrive device coupled to the one or more engines;
a steering system comprising:
a steering device configured to change a cruising direction of the vessel body;
a steering sensor configured to detect a first operation amount of the steering device at a first time and detect a second operation amount of the steering device at a second time;
a memory storing instructions; and
a processor operationally coupled to the memory, the propulsion system, and the steering system, the processor configured to execute the instructions to cause the processor to:
receive, from the steering sensor, an indication of the first operation amount of the steering device;
compare the first operation amount to a first threshold;
based on a determination that the first operation amount is less than the first threshold, control an output direction of the first outdrive device to be the same as an output direction of the second outdrive device; and
based on a determination that the second operation amount is greater than the first threshold, control the output direction of the first outdrive device to be opposite to the output direction of the second outdrive device.

8. The boat of claim 7, wherein, when the output direction of the first outdrive device is opposite the output direction of the first outdrive device, the output direction of the first outdrive device comprises a forward direction and the output direction of the second outdrive device comprises a reverse direction.

9. The boat of claim 7, wherein:
the output direction of the first outdrive device being the same as the output direction of the second outdrive device is associated with a non-pivot turn of the vessel body; and
the output direction of the first outdrive device being opposite to the output direction of the second outdrive device is associated with a pivot turn of the vessel body.

10. The boat of claim 9, wherein the pivot turn is associated with no forward and backward movement with the vessel body.

11. The boat of claim 7, wherein:
the steering device comprises a steering wheel; and
the first threshold corresponds to a value of 360 degrees.

12. The boat of claim 7, further comprising:
a detection unit configured to detect a speed of the vessel body; and
wherein the processor is further configured to execute the instructions to cause the processor to:
receive, from the detection unit, an indication of the speed of the vessel body;
compare the speed to a second threshold; and
control the output direction of the first outdrive device to be opposite to the output direction of the second outdrive device further based on a determination that the speed is less than or equal to the second threshold, and the second operation amount is greater than the first threshold.

13. The boat of claim 7, further comprising:
a notification device coupled to the processor and configured to issue an audio indication, a visual indication, or both; and
wherein the processor is further configured to execute the instructions to cause the notification device to issue a notification associated with the output direction of the first outdrive device being opposite to the output direction of the second outdrive device.

14. The boat according to claim 7, wherein the one or more engines comprise:

a first engine coupled to the first outdrive device; and
a second engine coupled to the second outdrive device.

15. A computer readable storage device comprising instructions, that when executed by a processor, cause the processor to:
   receive, from a steering sensor, an indication of a first operation amount of a steering device of a boat comprising a vessel body and a propulsion system, steering device configured to change a cruising direction of the vessel body, the propulsion system including a first outdrive device and a second outdrive device; and
   based on a determination that the first operation amount is less than a first threshold, initiate execution of a non-pivot turn of the vessel body; and
   based at least in part on a determination that a second operation amount of the steering device is greater than the first threshold, initiate execution of a pivot turn of the vessel body.

16. The computer readable storage device of claim 15, wherein, to initiate execution of the pivot turn of the vessel body, the instructions, when executed by the processor, further cause the processor to:
   control an output direction of the first outdrive device to be opposite to an output direction of the second outdrive device.

17. The computer readable storage device of claim 16, wherein the instructions, when executed by the processor, further cause the processor to:
   receive an indication of a speed of the vessel body; and
   initiate the execution of the pivot turn of the vessel body based further on a determination that the speed is less than or equal to a second threshold.

18. The computer readable storage device of claim 17, wherein the instructions, when executed by the processor, further cause the processor to:
   in response to a determination to initiate execution of the pivot turn of the vessel body, initiate presentation of a notification associated with execution of the pivot turn of the vessel body.

19. The computer readable storage device of claim 15, wherein the instructions, when executed by the processor, further cause the processor to:
   compare the first operation amount to the first threshold;
   receive, from the steering sensor, an indication of the second operation amount; and
   compare the second operation amount to the first threshold.

* * * * *